J. Dickinson,
Dressing Millstones.
No. 1,475. Reissued May 19, 1863.
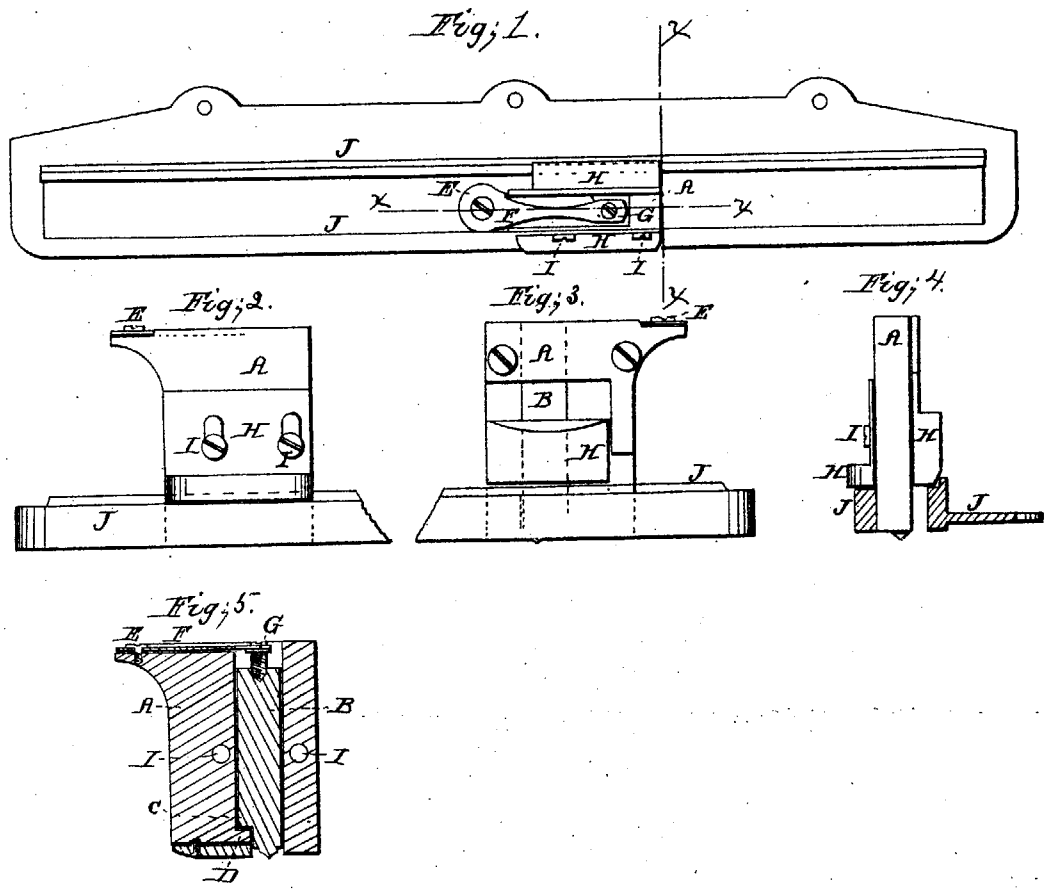
Witnesses;
B. W. Eichholtz
Chas. L. Barrett
Inventor;
John Dickinson
AM. PHOTO-LITHO. CO. N.Y. (OSBORNE'S PROCESS)

UNITED STATES PATENT OFFICE.

JOHN DICKINSON, OF BROOKLYN, NEW YORK.

DIAMOND-PROTECTOR.

Specification forming part of Letters Patent No. 33,187, dated September 3, 1861; Reissue No. 1,475, dated May 19, 1863.

*To all whom it may concern:*

Be it known that I, JOHN DICKINSON, of Brooklyn, Kings county, State of New York, have invented certain new and useful Improvements in Diamond-Protectors for Dressing Millstones; and I do hereby declare the following to be a full description of the same.

The nature of my invention consists, first, in the method of constructing the stem in which the diamond is set, and combining it with a stock or diamond stem-holder for the purpose of protecting the setting of the diamond when being drawn across the face of the millstone; second, in the method of making the pressure of the diamond on the face of the millstone self-adjustable by means of a tension-spring acting upon the diamond-stem, in combination with the protector-stock; third, in the method of gaging and controlling the depth of the cut of the diamond in the face of the stone by means of a gage, in combination with a protector-stock for the purpose of supporting it upon the edge or edges (as the case may be) of a single or double guideway rule; fourth, in the combination of a diamond-holder protector-stock having a gage attached thereto for regulating the set of the diamond with reference to the depth of the cut in the face of the stone to be made, with a double-way guide-rule as a means of supporting and giving steadiness of motion to the diamond when being drawn across the face of the millstone and at the same time enabling the operator to make the parallel cuts in the face of the stone more perfectly and evenly than could be done if the diamond-stock was not supported at opposite sides in the guideway.

But to describe my invention more particularly I will refer to the accompaning drawings, forming a part of this specification, the same letters of reference wherever they occur referring to like parts.

Figure 1 is a plan view of the protector, in combination with a double guideway parallel rule. Fig. 2 is a right-hand side view of the protector. Fig. 3 is a left-hand side view of the protector. Fig. 4 is a transverse-cut section of the double guideway parallel rule, showing an end elevation of the protector through the line $x^2$ $x^2$, Fig. 1. Fig. 5 is a vertical-cut section of the protector through the line $x$ $x$, Fig. 1.

Letter A is a diamond stem-holder or protector-stock, having a square or other shaped opening vertically through it. In this opening is arranged a metal stem, B, having in its lower end a diamond. To prevent the diamond from projecting too far below the face of the protector-stock, so as to be liable to fall into any cavities in the face of the stone and thus endanger the setting, if not destroy it as well as the diamond, a ledge, C, is formed on the stem B, which, resting upon a corresponding ledge, D, in the sides of the opening through which it operates, prevents the diamond from coming in contact with any object below a given and fixed point, and thus protects it against the numerous accidents it would be subjected to in drawing rapidly across the face of a millstone if not thus limted in coming in contact with the stone.

For the purpose of giving to the diamond an elastic and at the same time constant pressure, I attach, by means of a screw, E, a spring, F, to the top of the stock A, so as to cause the opposite end of the spring to rest upon the head of an adjustable set-screw, G, in the head of the stem B. By this means, and according to the set of the adjustable screw G, a greater or less tension can be given to the spring to force the point of the diamond into the face of the stone to give it the requisite grinding-surface. It will be obvious that this precise mode of applying the spring to give to the diamond a self-adjustable pressure upon the stone may be varied, by giving to the spring a spiral form, and adjusting it upon the stem B, so as to produce the like effect obtained by the use of the spring F, herein described; but as such variation is only in mode of application, and not in principle or effect produced, I deem them one and the same invention, and so intend to use one or both modes of applying a spring to the stem B as circumstances may suggest.

Letters H are gages attached to the sides of the protector-stock by set-screws I. These gages are made adjustable, and their object is to control the set of the protector in the guide-rule J, and at the same time support it in a firm and steady manner on the rule when being drawn across its length to cut the stone. Where a single straight-edge rule is used, the two gages H and H on the opposite sides of the protector are not absolutely necessary for the working of the instrument, as the inner gage H may answer to support the instrument on a single straight-edge rule; but I do not deem a single straight-edge rule sufficient to give the required steadiness of motion to the diamond to draw lines parallel to each other on a scale of some twenty to thirty lines to the inch—the range usually adopted by millers in dressing millstones with the diamond. I therefore prefer the double guide-way rule and the two adjustable gages attached to the protector or diamond-holder as being the only safe way of making perfect parallel lines for the dressing of the face of the millstone.

Having now described my invention, I will proceed to set forth what I claim and desire to secure Letters Patent—

1. The stem B, having a ledge or stop *c* in its side, in combination with a diamond stem-holder or stock, A, having a ledge, D, or other equivalent device for limiting the motion of the stem, substantially as hereinbefore set forth.

2. The combination of the tension-spring F, applied as hereinbefore set forth, in combination with the stem B and protector-stock A, for the purposes hereinbefore set forth.

3. The combination of the gages H, or equivalent device, for supporting the diamond-holder on a single or double straight-edge rule, with the diamond-holder, substantially as hereinbefore set forth.

4. The combination of a double straight-edge guide-rule, with the gages H and diamond-protector stock, substantially as hereinbefore described, and for the purposes set forth.

JOHN DICKINSON.

Witnesses:

B. W. EICHOLTZ,

CHARLES L. BARRITT.